United States Patent Office 3,027,345
Patented Mar. 27, 1962

3,027,345
CONDENSATION PRODUCT OF CRESYLIC ACID RESIN AND PHENOL RESIN
Elsio Del Bel, Leslie A. Heredy, and Martin B. Neuworth, Pittsburgh, Pa., assignors to Consolidation Coal Company, Pittsburgh, Pa., a corporation of Pennsylvania
No Drawing. Filed Sept. 17, 1959, Ser. No. 840,527
16 Claims. (Cl. 260—38)

This invention relates to a novel thermoplastic phenolic-type novolac resin useful in shell-molding compositions and to methods for preparing this resin. More particularly, this resin is a condensation product of a thermoplastic phenolformaldeyde novolac resin and an incompletely intercondensed cresylic acid-formaldehyde resin. The specific method used for preparing the resin of this invention is referred to as "interrupted distillation."

Resinous phenol-aldehyde condensation products have been known for many years. These phenolic resins usually employ phenol and formaldehyde as starting materials and consist principally of two types: thermosetting and thermoplastic resins. Typically, if the resins are prepared using an excess of formaldehyde in the presence of an alkaline catalyst, they resemble the phenol alcohols and have methylol side or end groups. Such resins are often referred to as resoles. They are termed "one-stage" resins and are of the thermosetting type in that the application of heat results in their forming resites, infusible three-dimensional polymers. The "two-stage" or novolac resins are almost invariably prepared with acidic catalysts. They are formed by using an excess of phenol. These novolac resins are phenol-ended chain polymers; they are of the thermoplastic variety and are permanently soluble and fusible. They require the addition of a curing agent in order for cure to be achieved.

Ordinarily, if an attempt is made to form a two-stage phenol-formaldehyde resin under typical reaction conditions using phenol in excess, but in the presence of an alkaline catalyst, it is found that only part of the phenol reacts with the formaldehyde. A resole-type one-stage resin is still formed, the excess phenol remaining unreacted. Thus, unless special reaction conditions are employed, such as, for example, prolonged heating for many hours in the absence of any catalyst, a novolac-type resin is formed only in the presence of an acidic catalyst.

Phenolic resins both of the novalac and resole types have also been prepared from other phenolic isomers and derivatives: for example, from alkyl-substituted phenols such as meta- and paracresols, 3,5-xylenol, thymol and carvacrol; from polyhydroxy phenols such as resorcinol and pyrocatechol; from aromatic hydroxycarboxylic acids such as salicylic and cresotinic acids. Attempts have also been made to prepare useful phenolic resins from various distillate fractions of cresylic acids. Cresylic acids, i.e., tar acids, are those caustic-soluble phenols obtained by the thermal treatment of hydrocarbonaceous materials such as petroleum, coal, lignite, and the like. Cresylic acid distillate fractions generally consist of mixtures of phenol, cresols, xylenols, higher-boiling alkyl phenols; they are often contaminated with organic nitrogen and sulfur compounds. The specific distribution of phenolic isomers present depends upon the origin of the starting material and upon the particular distillate fraction selected. Thus a low-boiling cresylic acid distillate fraction includes those phenolic isomers having a boiling range between about 180 and 230° C. This boiling range includes principally phenol, cresols, xylenols, and mono-ethylphenols. If some neutral tar acid oils are present as contaminants, the boiling range may be lowered to about 160° C.

In the various attempts made to prepare useful synthetic resins from heterogeneous mixtures containing cresylic acids, two types of tar starting materials have generally been used: either a tar distillate fraction containing a mixture both of cresylic acids and neutral hydrocarbon oils, or a cresylic acid distillate fraction free from any admixed hydrocarbon oils. For example, in U.S. Patent 2,527,065 is described the preparation of a thermosetting phenolic-type resin by the treatment of a mixture of cresylic acids and hydrocarbon oils with paraformaldehyde in the presence of an alkaline catalyst. In the allowed copending application of B. W. Jones and M. B. Neuworth, Serial No. 489,104, filed February 18, 1955, and assigned to the assignee of this invention, a process is described for preparing purified phenolic isomers from a mixture of low-boiling cresylic acids by the selective resinification of a portion of these cresylic acids in the presence of an acid catalyst. This latter process results in the production of a thermoplastic novolac-type resin having a preponderance of phenol end groups and essentially free from methylol end groups. The resulting resin has a softening point considerably below that produced by the process of the present invention and is considered unsuitable for use in conventional shell-molding technology.

In the copending application of M. B. Neuworth and E. Del Bel, Serial No. 693,819, filed November 1, 1957, and assigned to the assignee of this invention, a process is described for preparing a thermoplastic phenolic-type novolac resin by reacting a cresylic acid distillate fraction in the presence of an alkaline condensation catalyst with a molar deficiency of a formaldehyde-yielding material. There is further described in this copending application a method for preparing a thermoplastic phenolic-type novolac resin which is essentially a physical blend obtained by melting together a thermoplastic phenolformaldehyde novolac resin and a thermoplastic substantially fully intercondensed resinous composition of formaldehyde and a cresylic acid distillate fraction. The blended resin produced by the aforesaid process has important applications, particularly in the shell molding art. However, where a hot-coating shell-molding resin is desired, the aforesaid blended resin possesses certain drawbacks because of its relatively higher melting point and its relatively lower cure rate compared with a straight phenolic resin. The condensation resin of the present invention is an improvement over the blended resin of the aforesaid process for most applications, and particularly for use in a hot-coating process for coating grains of sand for use in shell molding applications.

Accordingly, it is an object of the present invention to provide a novel thermoplastic two-stage phenolic-type novolac resin.

It is an additional object to provide a cresylic acid-derived thermoplastic phenolic-type resin having an improved high temperature stability compared with that of thermoplastic phenolic resins heretofore available.

It is yet an additional object to provide a thermoplastic phenolic-type novolac resin derived from a cresylic acid-formaldehyde resin and particularly suitable for use in shell molding applications.

It is still a further object to provide a process for treating an incompletely intercondensed resinous composition of formaldehyde and a cresylic acid distillate fraction to produce the thermoplastic phenolic-type novolac resin of this invention.

According to this invention, a thermoplastic phenolic-type novolac resin is prepared as a condensation product of two resins, designated as resins A and B. Resin A is a thermoplastic phenol-formaldehyde novolac resin prepared by conventional acid catalysis. Resin B, prepared by alkaline catalysis, is an incompletely intercondensed resinous composition of formaldehyde and a cresylic acid distillate fraction containing at least two phenolic components having different relative resinification reactivities. This fraction preferably has a boiling range of at least 25° between about 180 and 230° C. and is substantially free of neutral hydrocarbon oils and sulfur compounds. Although the condensation product resin is always a thermoplastic two-stage resin, resin B may be either thermoplastic or thermosetting. The condensation product resin when used for forming shell molds is preferably formed by condensing from 25 to 75 parts by weight of resin A with from 75 to 25 parts by weight of resin B, respectively.

More specifically and preferably, the thermoplastic phenolic-type novolac resin of this invention is prepared by first intercondensing a molar equivalent of a cresylic acid distillate fraction substantially free of neutral hydrocarbon oils and sulfur compounds and having a boiling range of at least 25° between about 180 and 230° C. with from 0.25 to 0.75 mole of formaldehyde in the presence of an alkali-metal hydroxide as catalyst. The procedure followed in this process to this stage is substantially as described in the above-mentioned copending application Serial No. 693,819, although a higher molar ratio of formaldehyde, namely in excess of 0.55 and up to 0.75, may be used in the present invention. Ordinarily, use of this higher ratio would result in a thermosetting resin. However, in the present invention, because the resinous composition of formaldehyde and the cresylic acid distillate fraction is incompletely intercondensed, resin B may be thermosettable. The final condensation product resin is always a thermoplastic two-stage resin.

In a preferred embodiment of this invention, after the incompletely intercondensed cresylic acid-formaldehyde resin has been formed, the water originally present together with that formed by the condensation reaction is removed either by distillation alone or by a preliminary decantation followed by distillation. Then, prior to the removal of any of the unreacted cresylic acids, a conventionally prepared acid-catalyzed thermoplastic phenol-formaldehyde novolac resin (resin A) is added to the incompletely intercondensed cresylic acid-formaldehyde resin (resin B) and substantially condensed therewith. In another embodiment, up to about 90 percent of the unreacted cresylic acids may be removed by distillation at a temperature not exceeding 140° C. before addition of the phenol-formaldehyde novolac resin to the cresylic acid-formaldehyde resin. Following addition of resin A at any stage up to about 90 percent removal of the unreacted cresylic acids, the interrupted distillation is then resumed, preferably at a temperature of about 150° C., and both the water formed by the condensation reaction and also the unreacted cresylic acids are removed. The thermoplastic phenolic-type novolac resin condensation product of this invention is then recovered as a distillation residue. The condensation product resin may be poured while still molten into a suitable container for congelation.

It is to be noted that in the process set forth in copending application Serial No. 693,819, after formation of the incompletely intercondensed cresylic acid-formaldehyde resin substantially all of the unreacted cresylic acids were removed by continuous uninterrupted distillation at a temperature up to 190° C., thereby effectively completing the intercondensation reaction and leaving the cresylic acid-formaldehyde resin recoverable as a distillation residue. This essentially completely intercondensed cresylic acid-formaldehyde resin was then physically blended, preferably while still in molten form, with the phenol-formaldehyde novolac resin to yield a blend which resulted in shell molds superior in thermal stability to shell molds formed from either resinous component alone, namely from either the phenol-formaldehyde resin or the cresylic acid-formaldehyde resin. However, shell molds formed from this resin blend had cure rates which were only intermediate those of shell molds formed separately from the cresylic acid resin and the phenol resin by themselves.

By use of the interrupted distillation technique characterizing the present invention, a thermoplastic phenolic-type novolac resin is obtained that is a condensation product rather than a physical blend. This resin yields shell molds retaining all of the superior heat-resistant features characterizing those prepared from the previous resin blend. Additionally, the resins of this invention have cure rates which more closely approximate those obtained with a conventional unblended phenolic resin. Thus the resin of this invention is particularly suitable for hot-coating and cold-coating shell molding applications.

By use of the term "intercondensing" or "intercondensation" to describe the process in which the thermoplastic or thermosetting cresylic acid-formaldehyde resin constituent (resin B) is formed, it is desired to point out that the reaction between the cresylic acid and the formaldehyde is considered to occur in a heterogeneous random manner. The formaldehyde molecules link different phenolic isomers into the same polymer chain structure. The resultant resin will therefore differ substantially from a resinous mixture of different phenolic isomers that have been individually condensed with formaldehyde and then physically intermixed or blended. The term "incompletely intercondensed" cresylic acid-formaldehyde resin, used to further characterize resin B, refers to the resin at a stage where a substantial number of reactive methylol groups are still present in the resin structure, even through all the formaldehyde has been consumed in the intercondensation reaction.

I. CRESYLIC ACIDS

The cresylic acid distillate fraction used in the preparation of the cresylic acid-formaldehyde resin constituent may be obtained from various sources. The term cresylic acids, or tar acids, is generally applied to phenol and its homologs, and may include phenol, cresols, xylenols, trimethylphenols, ethylphenols, and higher boiling materials such as dihydroxyphenols, polycyclic phenols and the like. Cresylic acids are obtained from the tar produced by the low-temperature carbonization of coal, lignite and the like, conventional high-temperature coke-oven tar, the liquid products of petroleum cracking, both thermal and catalytic, shale oil, coal hydrogenation products and the like. Distillate fractions of cresylic acids boiling up to about 230° C. will contain virtually all of the phenol, cresols, xylenols and monoethylphenols in the crude phenolic mixture. The specific distribution of isomers in the distillate fraction of cresylic acids is dependent upon the origin of the cresylic acid mixture and the processing conditions employed.

This mixture of cresylic acids can, of course, be separated by fine fractionation into fractions containing relatively pure phenolic isomers or close-boiling isomeric pairs. This invention is considered applicable to the treatment of such isomer-containing fractions provided they contain at least two components having different relative resinification reactivities, such as, for example, a mixture of meta- and paracresols. However, the present invention is particularly and primarily directed to a process for preparing a novel thermoplastic resin from the entire cresylic acid distillate fraction having a boiling range of at least 25° between about 180 and 230° C., without preliminary fine fractionation. While cresylic acid distillate fractions having a boiling range between about 160 and 230° C. may be used, the lower boiling portion of the range, i. e., between 160 and 180° C., is generally due to the presence of certain nonphenolic contaminants. It is considered preferable for the purposes of the present invention that the cresylic acid mixture be relatively free of the various nonphenolic contaminants. The contaminants ordinarily associated with cresylic acid mixtures are sulfur compounds such as thiophenols and aryl sulfides, nitrogen compounds, tar bases and neutral oil constituents. There are many processes well known in the art for removing such contaminants from tar acid mixtures.

It is particularly preferred to use a purified cresylic acid distillate fraction. Such a fraction is substantially free of neutral hydrocarbon oils and sulfur and nitrogen compounds. This fraction should preferably have a boiling range of at least 25° between about 180 and 230° C. Phenol, the lowest member of the homologous series, boils at about 180° C. Where phenol is first removed from such a distillate mixture, by fractional distillation, i. e., so-called "topping," a tar distillate remains having a boiling range over the entire range between 190 and 230° C. If "topping" is continued, further removing o-cresol, and also 2,6-xylenol if this is present, a tar distillate fraction remains having a boiling range between approximately 202 and 230° C. Either of these two topped fractions, i. e., with phenol removed or with both phenol and o-cresol (and also 2,6-xylenol) removed, are considered particularly suitable for producing the resins of this invention.

In Table I is shown a typical isomer distribution of phenolic materials present in cresylic acid distillate fractions obtained from various sources.

Table I

ISOMER ANALYSES OF CRESYLIC ACIDS FROM VARIOUS SOURCES

[Boiling range 180–230° C.]

| Isomer | High Temp. Tar | Petroleum I | Petroleum II | LTC [1] | Crude Import |
|---|---|---|---|---|---|
| Phenol | 28.4 | 14.2 | 16.3 | 9.9 | 3.2 |
| o-Cresol | 13.8 | 17.4 | 21.0 | 12.6 | 15.3 |
| 2,6-Xylenol | | 0.9 | 0.9 | 2.1 | 2.0 |
| m-Cresol | 23.7 | 17.7 | 19.9 | 15.1 | 8.0 |
| p-Cresol | 12.5 | 8.0 | 7.6 | 11.2 | 6.5 |
| o-Ethylphenol | | | 0.6 | 0.3 | 0.2 |
| 2,4-Xylenol | 4.5 | 8.0 | 6.8 | 12.4 | 13.7 |
| 2,5-Xylenol | 2.5 | 7.1 | 5.3 | 5.9 | 4.8 |
| 2,3-Zylenol | 1.3 | 2.4 | 1.9 | 1.8 | 2.5 |
| m-Ethylphenol | 2.4 | 6.5 | 5.1 | 5.5 | 9.2 |
| p-Ethylphenol | 1.0 | | 1.0 | 4.9 | 7.4 |
| 3,5-Xylenol | 6.3 | 5.5 | 6.1 | 4.0 | 8.8 |
| 3,4-Xylenol | 2.8 | 7.5 | 3.5 | 6.5 | 5.9 |
| $C_9$—$C_{10}$ Phenols | | 4.8 | 4.1 | 7.7 | 12.5 |
| Total | 99.2 | 100.0 | 100.1 | 99.9 | 100.0 |

[1] Low temperature carbonization of bituminous coal.

It will be noted from the foregoing table that a typical heterogeneous mixture of cresylic acid will include compounds having different rates of reactivity. Generally, compounds having two or three reactive hydrogen positions, that is, unsubstituted in the ortho and para positions of the molecule, are more reactive than compounds that have respectively only one or two functional positions. It has been found that the relative resinification reactivities of the phenolic isomers present may vary by as much as 50:1. In order of decreasing relative reactivity, as measured by relative rate of disappearance of the phenolic compound, the compounds arranged themselves approximately as follows: 3,5-xylenol, m-cresol, 3,4-xylenol, 2,5-xylenol, 2,3-xylenol, phenol, p-cresol, o-cresol, 2,4-xylenol, 2,6-xylenol.

In Table II are shown analyses of topped cresylic acids particularly suitable in the practice of this invention.

Table II

ANALYSES OF TOPPED CRESYLIC ACIDS BY GAS CHROMATOGRAPHY

| Cresylic Acid | Boiling Point, °C., at 760 mm. | Topped Acid I, percent by weight | Topped Acid II, percent by weight |
|---|---|---|---|
| Phenol | 182 | | |
| o-Cresol | 191 | | 0.7 |
| 2,6-Xylenol | 201 | | 0.9 |
| m-p-Cresol | 202 | 47.7 | 44.1 |
| o-Ethylphenol | 207 | 1.9 | |
| 2,4,2,5-Xylenol | 210 | 21.2 | 21.4 |
| m-Ethylphenol | 214 | | |
| 2,3-Xylenol | 213 | 20.5 | |
| p-Ethylphenol | 219 | | Balance: 33.0 |
| 3,5-Xylenol | 220 | | |
| 3,4-Xylenol | 225 | 5.3 | |
| $C_9$—$C_{10}$Phenol | 228–230 | 3.4 | |

As can be seen from Table II, the topped acids, from which substantially all the phenol, o-cresol and 2,6-xylenol have been removed, have a boiling range of approximately 25° C., inasmuch as the $C_9$—$C_{10}$ phenols need not be included in the cresylic acid fraction used. It will of course be realized that in actual plant practice, distillation cuts overlap somewhat and will not exactly correspond to data obtained under carefully controlled laboratory conditions. Thus topped acid I, obtained under precision distillation conditions, is considered free of even trace amounts of o-cresol and 2,6-xylenol. In general, the topped acids may contain from 10 to 50 percent of m-p-cresol, with the balance of higher-boiling alkylphenols to make 100 percent.

Under the conditions used in practicing the present invention, namely, the reaction of one mole equivalent of cresylic acids with from 0.25 to 0.75 mole formaldehyde, only a partial, selective resinification of the cresylic acid mixture by intercondensation with formaldehyde will occur. It is therefore considered essential that any heterogeneous mixture of low-boiling cresylic acids that is intercondensed with formaldehyde have at least 5 percent thereof and up to 70 percent recoverable as unreacted cresylic acids.

Any convenient source of formaldehyde-yielding, i. e., methylene-group-yielding, material may be used for the intercondensation reaction. Suitable materials include formalin, para-formaldehyde, trioxymethylene, hexamethylenetetramine, and the like. Formalin, commercially available as a 37 or 40 percent aqueous solution of formaldehyde, is generally preferred because of its relative convenience in use.

II. REACTION CONDITIONS

In order to obtain suitable shell molding resins, the intercondensation reaction used to prepare the incompletely intercondensed cresylic acid-formaldhyde resin constitute requires the presence of an inorganic nonvolatile metal-derived alkaline condensation catalyst. While various such alkaline catalysts may be employed, such as sodium hydroxide, barium hydroxide, potassium hydroxide and the like, in general the use of a strong alkaline catalyst such as sodium hydroxide is preferred because of its high degree of effectiveness, its low price and its convenient availability. While catalytic amounts of the alkaline condensation catalyst, based on the weight of cresylic acids used, may be as low as 0.1 percent, amounts from 0.5 to 5 percent by weight are preferred.

The molar ratio of formaldehyde to cresylic acid used, as well as the presence of a nonvolatile alkaline catalyst, is considered critical in obtaining resin B. Ordinarily, an alkaline-catalyzed phenol-formaldehyde condensation will result in the formation of a thermosetting resin, even if a molar insufficiency of formaldehyde is used. However, where a heterogeneous cresylic acid fraction is used, containing phenolic components such as alkylphenols having different relative resinification reactivities, and where only a partial resinification is permitted to occur, it is possible to obtain a higher melting alkaline-catalyzed cresylic acid-formaldehyde resin which is thermoplastic in nature, i. e., a typical two-stage resin. However, to obtain this resin, a critical ratio of formaldehyde to cresylic acid cannot be exceeded. Thus, as pointed out in copending application Serial No. 693,819, where the starting cresylic acid contains components boiling over the entire range of 180 to 230° C., i. e., starting with phenol, from 0.25 to 0.50 molar equivalents of formaldehyde may be used. Where topped cresylic acids are used, i. e., with both phenol and o-cresol removed, a formaldehyde to cresylic molar ratio of 0.55 may be employed and still result in the formation of a thermoplastic cresylic acid-formaldehyde resin.

However, in the practice of the present invention, topped cresylic acids may be reacted with up to 0.75 mole of formaldehyde. The cresylic acid-formaldehyde resins formed using formaldehyde molar ratios between 0.55 and 0.75 are thermosetting in nature. However, the incompletely intercondensed cresylic acid-formaldehyde resin is arrested at the resole stage and not permitted to become fully intercondensed by attempted recovery as a separate resin; i. e., it is condensed in situ with the phenol-formaldehyde resin. Therefore, such higher formaldehyde ratios may be employed. Where formaldehyde molar ratios in excess of 0.75 are used, a thermosetting resite resin will be formed during the stage of incomplete intercondensation.

Where topped cresylic acids are used (boiling range about 200–230° C.; i. e., including m-p-cresol and higher-boiling phenols) and where the final condensation product resin is obtained by reacting from 30 to 50 parts of resin A with from 70 to 50 parts of resin B, a preferred molar formaldehyde range is between 0.54 and 0.64, particularly preferred for obtaining resins having suitable melting points for use in various shell molding applications.

III. CONDENSATION PRODUCT OF RESINS A AND B

In a typical run, in which the interrupted distillation technique is used to produce the resin of this invention, one molar equivalent of the cresylic acid distillate fraction, either topped or untopped, is intercondensed with from 0.25 to 0.75 molar equivalents of formaldehyde or a formaldehyde-yielding material. Generally, the use of topped cresylic acids as starting material permits the use of higher formaldehyde to cresylic acid ratios. From 0.1 to 5 percent by weight of an inorganic nonvolatile metal-derived alkaline condensation catalyst is present, one percent sodium hydroxide by weight of the cresylic acids being suitable and preferred. The formaldehyde, cresylic acid distillate fraction, and the alkaline catalyst are heated together, preferably to reflux conditions, and maintained at a reflux temperature of approximately 100° C. until substantially all the formaldehyde has reacted with the cresylic acids. A reflux time of about one hour is suitable and preferred. While reflux conditions are preferred, corresponding to a temperature of about 100° C., lower temperatures such as 50° C. may be employed, heating being continued for a correspondingly longer period of time.

At this stage, the incompletely intercondensed cresylic acid-formaldehyde resin (resin B) has been formed, all the formaldehyde having been consumed, and a maximal amount of reactive methylol groups being present. The phenol-formaldehyde resin (resin A) may be condensed with resin B at any subsequent stage, up to removal of about 90 percent of the unreacted cresylic acids. Thus addition of resin A may be made prior to neutralization of the catalyst; or after neutralization and prior to removal of the water of condensation; or after water removal and prior to removal of unreacted cresylic acids; or after removal of all but 10 percent of the unreacted cresylic acids. Where a high formaldehyde to cresylic acid ratio is used, i. e., between 0.55 and 0.75, early addition of resin A is preferred lest resin B be converted inadvertently from the resole to resite stage. It will be apparent that as removal of unreacted cresylic acids by heating is continued, fewer methylol groups will be available on resin B (because of self-condensation) for condensation with resin A because of the application of heat.

In a preferred embodiment, resin A is added following neutralization and dehydration. Thus, following the interconsensation reaction, the solution is neutralized to a pH between 5.5 and 7, preferably using a stoichiometric quantity of a strong acid such as sulfuric, hydrochloric, phosphoric, or oxalic acid, or the like. Sulfuric acid is conveniently employed to neutralize the sodium hydroxide catalyst. While of course the alkaline catalyst may be neutralized by dilution through repeated washing and decantation, it is preferred to use an acid, and particularly a strong mineral acid, to neutralize the catalyst. Neutralization may be accomplished within a period of approximately 25 minutes. The resin is allowed to settle at a temperature between 80 and 95° C. for approximately half an hour, and then from 20 to 50 percent of the water of condensation formed together with that originally present may be removed over a period of approximately half an hour by decantation. Dehydration of the remaining water is preferably accomplished at a temperature well below 140° C. In a typical run, a temperature of 115° C. at a pressure of 50 mm. Hg over a period of approximately 2 hours was employed. At this stage an incompletely intercondensed cresylic acid formaldehyde resinous composition is present that contains a considerable amount of methylol groups.

Depending upon (a) the initial composition of the cresylic acid, (b) the formaldehyde to cresylic acid ratio initially used, and (c) the desired melting point of the subsequently formed condensation resin, the condensation of resin B with the phenol-formaldehyde resin (resin A) may be preferably effected at this stage, or up to about 90 percent of the unreacted cresylic acids may be removed. Where unreacted cresylic acids are removed prior to condensation of resins A and B, the distillation must be accomplished at a temperature below 140° C. Furthermore, no more than 90 percent of the unreacted cresylic acids present may be removed. Otherwise, a completely intercondensed cresylic acid-formaldehyde resin may result. The unreacted cresylic acids generally represent from about 5 to 70 percent of the cresylic acids initially present, depending upon the quantity of formaldehyde intercondensed therewith and other reaction conditions. At the stage where up to 90 percent cresylic acids have been removed at a temperature below 140° C., the incompletely intercondensed cresylic acid-formaldehyde resin contains fewer methylol groups than initially present at the stage immediately following dehydration, but still sufficient in number to effect a condensation reaction with the phenol-formaldehyde resin which is then added.

The phenol-formadehyde resin (resin A) is added in either the molten or solid state at a temperature between 120 to 135° C. over a period of approximately half an hour. From 25 to 75 parts of resin A respectively are added per 75 to 25 parts of resin B present. The reaction system is then heated to 150° C., with continuous stirring, and maintained at temperature for half an hour. The water of condensation formed by the condensation reaction between resins A and B is conveniently removed at a temperature between 150 and 155° C. at a pressure between 100 and 200 mm. Hg, over a period of approximately half an hour. The interrupted distillation is then continued in order to recover the remainder of the unreacted cresylic acids. This is conveniently accomplished at a temperature between 160 and 170° C., using corresponding pressures between 40 and 50 mm. Hg, over a period of approximately one to two hours. Depending upon particular reaction conditions, approximately 3 to 10 percent of unreacted cresylic acids may become physically combined with the condensation product resin and not conveniently separable therefrom. The condensation product resin is then conveniently poured while in the molten state into a suitable vessel, allowed to solidify, and comminuted to a particle size approximately between −200 and −325 mesh. The finely divided condensation product resin is then intimately admixed with from 5 to 25 percent by weight of a phenolic curing agent, such as hexamethylenetetramine, to form a thermosetting phenolic type resin, particularly suitable for shell molding applications.

The acid-catalyzed thermoplastic phenol-formaldehyde novolac resin, characterized herein as resin A, is a conventional article of commerce. A suitable novolac resin of this type, referred to as Consol "2061" phenol resin, may be prepared by the condensation of phenol and formaldehyde in a mole ratio of 1.0:0.81, respectively, using 0.3 weight percent concentrated sulfuric acid, based on phenol, as catalyst. Initially, only 7 percent of the total quantity of sulfuric acid is added to the mixture of phenol and formaldehyde, which is then heated to reflux. After 15 minutes of reflux, the remainder of the sulfuric acid, in the form of a 50 percent aqueous solution, is added slowly over a period of 15 to 20 minutes. The total reflux period is 1.5 hours. The resin is then dehydrated under vacuum, and part of the unreacted phenol is recovered by vacuum distillation. The end point of the distillation is about 135–145° C., kettle temperature, at 50–70 mm. Hg pressure, at the point where the melting point of the resin is adjusted to approximately 85±3° C. The resin is then dumped from the kettle and ground to suitable particle size for condensation with the cresylic acid formaldehyde resin.

Inasmuch as the condensation reaction that occurs between the incompletely intercondensed cresylic acid-formaldehyde resin and the phenol-formaldehyde resin, is considered feasible because of the presence of methylol groups on the incompletely intercondensed resin, the determination of these groups was undertaken. The methylol groups were determined on a series of samples obtained from the reaction of 1.92 moles of formaldehyde with 4.0 moles of a 180–230° C. cresylic acid distillate fraction (0.48:1 molar ratio) using 1 percent sodium hydroxide as catalyst. After reflux, neutralization and dehydration, removal of the unreacted cresylic acids was begun. When the distillation temperature reached 140° C. at 50 mm. Hg pressure, 30 percent by weight of a phenol-formaldehyde novolac resin (resin 2061) was added (70:30 resin). The run was terminated at an end point of 160° C. at 50 mm. Four samples were withdrawn during the course of the reaction: sample 1, at the end of the reflux; sample 2, after neutralization; sample 3, at 140° C., just prior to the addition of the phenol-formaldehyde resin; sample 4 represents the finished resin. The methylol groups were determined on each of the foregoing samples according to the method of R. W. Martin Anal. Chem. 23, 883–884 (1951). It was found that all formaldehyde had been completely consumed in the reaction. Table III summarizes the results obtained for the several samples.

*Table III*

METHYLOL CONTENT OF VARIOUS STAGES OF THE REACTION

Sample: Weight percent Methylol
 (1) End of reflux _____ 14.32
 (2) After neutralization _____ 10.62
 (3) 140° C. at 50 mm. Hg pressure _____ 1.05
 (4) Finished resin _____ 0.38

The foregoing resin reaction system produces a 65 percent by weight resin yield based on the weight of cresylic acids charged. One mole of cresylic acids (average molecular weight 112) contributes 73.0 grams of reacted cresylic acids. The formaldehyde consumed is 0.48 mole or 14.4 grams. The theoretical methylol content of the resin after refluxing is therefore 16.5 percent. The value of 14.3 percent obtained indicates that 86.7 percent of the formaldehyde exists as methylol groups at the end of the reflux period. As may be noted from the table, the major portion of the resin chain formation occurs at the higher temperatures of the subsequent distillation of unreacted acids. Thus the finished resin contains almost no methylol groups, as compared with the 87 percent initially present at the end of the reflux period.

In Table IV is summarized the results obtained in different runs by varying the point of addition of the phenol-formaldehyde resin to the incompletely intercondensed cresylic acid-formaldehyde resin. As may be noted, addition of the phenolic resin at the stage following dehydration resulted in a resin having optimum flex properties.

*Table IV*

EFFECT OF THE STAGE OF ADDITION OF THE PHENOL RESIN TO CRESYLIC RESIN

| Run No. | Stage of Addition of Phenolic Resin | Reaction Temp. of A and B, °C. | Dist. Endpoint Vacuum Hg mm. | Dist. Endpoint Temp. °C. | M.P., °C. | Yield, wt. percent | Flex mm. 65 sec. | Flex mm. 60 sec. | Flex mm. 55 sec. | Tensile Strength, lb./sq. inch, 90 seconds |
|---|---|---|---|---|---|---|---|---|---|---|
| 1 | After reflux | 100 | 50 | 152 | 92 | 68.3 | 3.2 | 5.2 | 18.7 | 264 |
| 2 | After neutralization | 90 | 50 | 152 | 88 | 69.7 | 2.1 | 4.1 | 12.8 | 339 |
| 3 | After the end of dehydration | 120 | 50 | 160 | 91 | 67.6 | 1.0 | 3.6 | 3.7 | 317 |
| 4 | After 72% recovery of unreacted acids | 140 | 50 | 158 | 98 | 67.2 | 2.5 | 4.1 | 9.6 | 325 |
| 5 | After 85% recovery of unreacted acids | 140 | 50 | 158 | 97 | 65.5 | 3.5 | 6.2 | 12.7 | 252 |
| Blended Phenol-Cresylic Resin | | | 50 | 160 | 100 | 65.0 | 2.7 | 4.2 | 12.0 | 238 |
| Acid-Catalyzed Phenolic Resin | | 140 | 50 | 140 | 88 | 99.0 | 0.2 | 0.5 | 4.5 | 295 |

In all runs: formaldehyde to cresylic acid mole ratio, 0.48:1.00; cresylic acid resin to phenol resin ratio, 70:30.

The flex test, which correlates very well with performance on a commercial shell machine, is designed to measure the relative hot rigidity of test pieces prepared from shell molding compositions. This is basically determined by the cure rate of the resin. A suitable shell molding composition consists of six parts of resin (containing the curing agent) per hundred parts of Dividing Creek sand (Superior grade) which have been mulled together for ten minutes. Basically, a bar-shaped test specimen heated under standard conditions is allowed to thermoset for differing periods of time before being supported at its ends only. The distortion of the unsupported center of the test piece in relation to a normal plane is designated as the flex of the specimen, corresponding to the cure rate of the resin. For the tensile test, which is a standard procedure in the shell molding industry, dogbone specimens are prepared under standardized conditions and then broken in a conventional tensile-testing machine. The melting points of the resins shown in Table IV are readily determined by a copper bar apparatus, wherein the resin in finely powdered form is spread in a thin layer on an electrically heated copper bar having a uniform temperature gradient along its length. The point along the bar at which melting occurs is observed. This apparatus is available as a Parr-Dennis type. The melting points obtained by this technique are approximately 15 to 20° lower (average 17°) than the softening points obtained by a standard ring and ball apparatus (ASTM method E 28–51T).

IV. SHELL MOLDING COMPOSITION

While the thermoplastic resin of this invention and the thermosetting resin derived therefrom are considered useful in the varnish art and for formulating special-type molding powders, they are particularly useful as ingredients in shell molding compositions. In the shell molding process for preparing metal castings, as generally practiced, a sand and a resin are blended together to provide a homogeneous mixture. The sand ordinarily used is a high silica content foundry sand, with an American Foundrymen's Society (AFS) fineness range from 70 to 155 (also designated as AFA fineness number). The resin ordinarily employed is a phenolformaldehyde phenolic resin containing hexamethylenetetramine as a curing agent. A metal pattern is preheated to a temperature between 90 and 400° C., preferably at about 250° C. The shell mold is then prepared by bringing a mixture of the sand and the resin into contact with this heated pattern to fuse the resin and for a period of time sufficient to build up the desired shell thickness. An excess of sand-binder mixture is ordinarily employed, and the unused excess is separated from the shell mold for use in preparing other molds. The shells are then heated at an elevated temperature between 300 and 800° C. until the resin binder sets. Usually, the cure or set time may range from several seconds to several minutes, depending upon the desired cycle and the temperature employed.

The use of the shell molding process for preparing metal castings has spread extensively in the foundry industry. The process is particularly advantageous for the quick and simple production of complicated molds inasmuch as close dimensional tolerances may be readily maintained. In addition, a better finish and lower cleaning costs for the casting result from the use of this process. However, one limitation heretofore existing in the widespread use of the shell molding process has been the cost of the materials used in this process. Various attempts have been made to reduce the costs of the shell molding process by using a lower silica-content sand, such as clay-bearing sands, and by using resin-coated sands. Shell compositions containing resin-coated sands generally require a lesser amount of resin compared with compositions in which the sand and resin are blended together. These cost-reducing attempts have not always been uniformly satisfactory. Furthermore, the shells made with phenolic resins as now used tend to be brittle and are unable to withstand a high degree of thermal shock. In addition, these shells are not entirely suitable for the casting of high-melting metals inasmuch as excessive burn-through results with consequent distortion of dimensional tolerances of the cast metal. It has been found that by utilizing the thermoplastic resin of the present invention, a shell molding composition may be prepared having improved resistance to thermal shock and improved high temperature stability. The resultant shells are thereby capable of withstanding temperatures far in excess of those that may be used with conventional phenol-formaldehyde resins. In addition, because a heterogeneous mixture of cresylic acids is used as a starting material rather than a highly purified material such as phenol, the resultant resin may be produced more cheaply.

It has been found that the thermoplastic condensation products of resins A and B having a copper bar melting point between 85 and 115° C., corresponding approximately to a ring and ball softening point range of 100 to 135° C., are particularly suitable and desirable for use in shell molding compositions. Especially preferred for hot-melt coating applications are those resins having a melting point between 90 and 100° C. In Table V is shown a suitable range of proportions that may be used for preparing a satisfactory shell molding composition.

*Table V*

SHELL MOLDING COMPOSITIONS

| Materials | Parts by Weight | Percent by Weight |
|---|---|---|
| (a) A particulate inorganic material having a fusing temperature above 750° C. | 200 to 10,000 | 91–99.8 (of total) |
| (b) A thermoplastic phenolic-type novolac resin condensation product of resins A and B. | 16 to 19 | |
| (c) A phenolic curing agent | 1 to 4 | 5–20 (of b and c) |

One part by weight of the condensation product (b) of resins A and B is first formed by condensing from .25 to .75 part of resin A with from .75 to .25 part of resin B. This condensation product is then blended with a suitable phenolic curing agent such as hexamethylenetetramine either prior to or concurrently with blending with the particulate inorganic material, which is preferably a sand of suitable AFS fineness. Suitably, the thermoplastic condensation product is intimately mixed with a phenolic curing agent such as hexamethylenetetramine using from 5 to 20 percent by weight of the curing agent and from 95 to 80 percent by weight of the thermoplastic condensation product, thereby giving a thermosetting phenolic type resin. One part of this thermosetting phenolic type resin is then intimately mixed with from 10 to 500 parts of the particulate inorganic material. The mixing may be done in a muller, blender or tumbling barrel, or by using a paddle mixer. A metal pattern of the object which is to be cast is heated to a temperature of approximately 250° C. The shell molding composition consisting of the inorganic material blended with the thermosetting resin is then dropped onto the heated pattern from a fixed height. Thereby a definite degree of packing of the composition on the pattern is achieved. After a dwell time or investment time of approximately 15 seconds on the heated pattern, the pattern is inverted and the excess molding composition removed. It is of course essential that the molding composition have sufficient plastic strength for an adherent shell of desired thickness, such as approximately one-half inch, to form on the pattern, so that the shell remains on the pattern firmly attached thereto when the pattern is inverted. After the pattern and adhering shell have been turned over, they are baked together as a unit in an oven at approximately 350° C. until the shell is cured. A period of time from 1 to 1½ minutes is usually sufficient to effect a satisfactory cure. The shell is then stripped from the pattern.

In many commercial applications of shell molding resins, a rapid cure time and good hot rigidity of the shell are important, particularly where mass production techniques are involved. Increasing the pattern temperature and the furnace temperature for the cure generally serves to lower the investment time and cure time required. The resin of the present invention is particularly effective in providing shells of improved rigidity while closely approximating the cure time of shells prepared from phenolformaldehyde resins alone.

It will be apparent to those skilled in this art that many variables affect the length of the investment or dwell time used, the length of the cure time, and the tensile strength and flexibility of the shell. Thus the length of the dwell time and the temperature used will determine the thickness of the shell. Where castings are small and the melting temperature of the metal is relatively low, the dwell time can of course be reduced to form thinner walls. Similarly, the nature of the resin, its softening point, the amount thereof incorporated with the particulate inorganic material, and the nature of the inorganic material itself will also affect the dwell time, the cure time and the resultant shell characteristics. Also, depending upon the specific demands of the production cycle, the ejection requirements of the mold from the pattern may vary. Thus the shell mold may be allowed to cool somewhat in situ before being ejected. Under other conditions, the mold may be required to have excellent hot rigidity characteristics.

It is also apparent that for certain shell mold applications the foundry sand that is ordinarily used may be replaced in all or in part by such materials as silica flour, zirconite flour, fly-ash, coke breeze, powdered alumina, or the like. In general, the sand used in the shell molding composition may be any particulate, inorganic material which does not fuse at temperatures below 750° C. Foundry sands, siliceous in character, having a fineness of at least 70 on the American Foundrymen's Society Fineness Scale are preferred. By the term "foundry sand" reference is made to an unbonded sand having a silica content of at least 90 percent. The term "unbonded sand" refers to one containing less than 5 percent of an AFS clay substance. The AFS (or AFA) fineness number refers to that fineness as determined by the standard tests described in "Testing and Grading Foundry Sands," 4th edition, 1938, American Foundrymen's Association, Chicago, Illinois.

While clay-free, siliceous round-grained sand is generally preferred, certain subangular high-silica or clay-bearing sands have also been used. The latter clay-bearing sands are particularly feasible for use where the sands are precoated with the resin. Such a technique, in addition to enabling the use of less expensive and lower grade sands, also allows the use of less resin.

The following illustrative examples, not intended as restrictive of the scope of this invention, show the preparation of suitable shell molding compositions.

*Example I*

A topped cresylic acid distillate fraction having the composition of topped acid I shown in Table II was used. The cresylic acid (1170 grams; 10.00 moles), 37 percent Formalin (519 grams; 6.40 moles formaldehyde), and sodium hydroxide as catalyst (11.70 grams; 1.0 percent based on the weight of the cresylic acids) were heated to 100° C. over a period of 30 minutes in a stainless steel kettle equipped with a stirrer. The mixture was refluxed for an hour and then neutralized with the stoichiometric amount of sulfuric acid (20.33 ml. of 50 percent sulfuric acid). Stirring was then continued for an additional 20 minutes. The pH of the aqueous layer was 6.7. The mixture was allowed to settle for an hour, and then approximately half of the aqueous phase was removed by decantation. The residue was dehydrated by vacuum distillation at 50 mm. Hg pressure up to a kettle temperature of 115° C. (In a corresponding run, heating was continued to remove the unreacted cresylic acids. A thermoset resin resulted.)

Following the dehydration, 730 grams of a conventional ("2061") thermoplastic phenol-formaldehyde novolac resin (solid; 0.5-inch particle size) was added over a period of 20 minutes at 120–130° C. The resin mixture was then heated to 150° C. and maintained at this temperature, with stirring, for 30 minutes in order to complete the condensation reaction. Then the interrupted vacuum distillation was resumed. First the water formed by the condensation reaction was distilled off (14 grams; 0.78 mole), and then the unreacted cresylic acids were recovered by raising the pot temperature to 170° C. at 47 mm. Hg pressure. The recovered unreacted cresylic acids weighed 222 grams (1.9 moles). The condensation product resin that was recovered weighed 1745 grams: consisting of the condensation product of 1015 grams of the cresylic acid resin and 730 grams of the phenolic resin. This corresponded to a cresylic acid to phenol weight ratio of 58.2:41.8. The melting point of the resin was 103° C. by copper bar apparatus.

The resin was ground to −200 mesh particle size and mixed with 15 percent by weight of hexamethylenetetramine. The finely ground mixture was milled with foundry sand (six parts resin per one hundred parts sand), and the milled product was used for various shell molding tests. The average performance of the thermoplastic condensation product resin closely approached that of a commercial shell molding phenolic resin with respect to cure time. As evaluated by the previously described flex test, the condensation product resin had a cure time of 65 seconds as against a cure time of 55 seconds for the phenolic resin. The tensile strength of the condensation product resin was 10 to 15 percent higher than that of the conventional phenolic resin.

The foregoing example illustrates the satisfactory results obtained using a formaldehyde to cresylic acid ratio of 0.64:1, the condensation product resin being prepared using 60 parts of the cresylic acid-formaldehyde resin and 40 parts of the phenol-formaldehyde resin.

A condensation product resin prepared as in Example I, but having a melting point of 110° C., proved particularly suitable as a cold-coating resin.

*Example II*

A satisfactory hot-coating resin was obtained using a 0.56:1 molar ratio of formaldehyde to cresylic acid, the resin being formed by condensation of equal parts by weight of an incompletely intercondensed cresylic acid-formaldehyde resin and a novolac phenol-formaldehyde resin.

The following reactants were used: 936 grams (8.00 moles) of topped cresylic acids (same composition as in Example I), 363 grams of 37 percent Formalin (4.48 moles of formaldehyde) and 9.36 grams of sodium hydroxide (1.0 percent based on the weight of cresylic acids). The mixture was heated to 100° C. over a period of 30 minutes in a stainless steel kettle equipped with a stirrer. The mixture was then refluxed for an hour, neutralized with the stoichiometric quantity of sulfuric acid (16.71 ml. of 50 percent sulfuric acid) and stirred for an additional 20 minutes. The pH of the aqueous layer was 6.7. The mixture was allowed to settle for an hour, and then approximately one-third of the aqueous phase was removed by decantation. The residue was dehydrated by vacuum distillation at 50 mm. Hg pressure up to a kettle temperature of 115° C.

At the end of dehydration, 730 grams of a thermoplastic phenol-formaldehyde novolac resin was added (solid, 0.5-inch particle size) in a period of 20 minutes at a temperature 120–130° C. The resin mixture was then heated to 150° C. to complete the condensation reaction, and stirred at this temperature for 30 minutes. Vacuum distillation was then resumed. The water formed in the condensation reaction was distilled off (12 grams, 0.67 mole), and the unreacted cresylic acids were recovered by raising the pot temperature to 172° C. at 3 mm. Hg pressure. The unreacted cresylic acids recovered weighed 215 grams (1.85 moles). After the completion of distillation, 1482 grams of the condensation product resin was recovered, formed by the condensation of 752 grams of cresylic acid resin and 730 grams of phenolic resin. This corresponds to a ratio of cresylic acid to phenol of 50.6:49.4, or essentially 1:1. The melting point of the resin was 95° C. The resin was ground to −200 mesh particle size and mixed with 15 percent by weight of hexamethylenetetramine. The finely ground mixture was milled with foundry sand (six parts of resin per one hundred parts of sand), and this milled product was used for shell molding tests. The average performance of the condensation product resin was approximately that of a commercial phenolic resin. Its cure time (evaluated by the previously described flex test) was 60 seconds as compared with 55 seconds for the phenolic resin, and its tensile strength was 10 to 15 percent higher than that of the phenolic resin.

The condensation product resin formed was also used for hot-coating tests. Foundry sand was hot-coated with 4 percent by weight of the resin and mulled with hexamethylenetetramine; the coated sand was used for laboratory and shell machine tests. The results obtained were comparable with those obtained where a suitable commercial phenolic resin was used for hot-coating. Thus, the condensation product resin required a 5-second longer cure time and gave a 10 to 15 percent higher tensile strength compared with the phenolic resin. In a production of shells on a commercial shell molding machine, the behavior of both resins was again almost identical.

It will of course be apparent to those skilled in the shell molding art that the choice of a specific resin having a specific melting point depends upon the application for which the shell mold is to be used. It will further be apparent to those skilled in this art that many modifications may be made in the procedures described herein without departing from the basic principles of this invention, which relate to the preparation of a thermoplastic condensation product of a thermoplastic phenol-formaldehyde resin (resin A) and an incompletely intercondensed cresylic acid-formaldehyde resin (resin B). The cresylic acid distillate fraction employed cannot be considered as having a definite and fixed stoichiometric chemical composition, but rather represents a heterogeneous mixture of various phenolic isomers boiling within a specific distillation range. Similarly, while the resinous compositions have been described with particular reference to use in forming shell molds, it is considered equally apparent that they may be utilized for producing either resinous shell cores or more conventional resinous solid cores. Thus the shell molding compositions described herein may be readily adapted to the blowing of shell cores.

The shell molding composition described herein may be prepared from the condensation product resin of this invention by any of the well known techniques such as dry blending, cold-coating, and hot-coating. The thermoplastic condensation product resin of this invention is particularly suitable for dry-mix, hot-coating and cold-coating application, depending upon the melting point of the resin. Lower melting-point resins (85–95° C.) are used for hot-coating; intermediate melting-point resins (95–105° C.) for dry-mixing; and higher melting-point resins (105–115° C.) for cold-coating. It will of course be apparent that the particular application desired may dictate the procedure to be employed. Thus dry-blending is extensively used in the shell making art because of the ease of operation involved, even though such blends require more resin per pound of sand than coated mixes, and occasionally segregation of sand and resin may occur. In cold-coating, the sand and resin are dry-milled together, and a solvent such as denatured alcohol is added, the mix being further wet-milled. Lubricants such as calcium stearate or other suitable unctuous materials may be incorporated at this point. The mix is then dried in a muller and is ready for use. While such a procedure requires less resin and minimizes dusting, it is more time-consuming and the use of volatile solvents may be objectionable. In hot-coating techniques, the sand is heated to the desired temperature in the muller, and the resin is added thereto. Mulling is continued until a homogeneous doughy mass is obtained. The mix is then transferred to a second muller or mill, and a hardening or curing agent is added as a powder or in water solution. The lumps formed are broken up, a lubricant is added and the mix is screened. This technique requires about the same quantity of resin as does cold-coating and provides a very uniform coating of sand.

The foregoing modifications in preparing shell molding compositions are readily available to those skilled in this art and may be applied utilizing the compositions described herein or modified to meet specific requirements. It is therefore to be understood that it is not intended to restrict the herein described invention by the illustrative examples given, but the scope of this invention is to be determined in accordance with the objects and claims thereof.

We claim:

1. A thermoplastic phenolic-type novolac resin comprising a condensation production of resins A and B wherein resin A is a thermoplastic phenol-formaldehyde novolac resin and resin B is an alkaline-catalyzed incompletely intercondensed resinous composition of formaldehyde and a cresylic acid distillate fraction containing at least two phenolic components having different resinification reactivities with respect to formaldehyde and boiling between about 180 and 230° C.

2. A thermoplyastic phenolic-type novolac resin comprising a condensation product of resins A and B wherein resin A is a thermoplastic phenol-formaldehyde novolac resin and resin B is an alkaline-catalyzed incompletely intercondensed resinous composition of formaldehyde and a cresylic acid distillate fraction substantially free of neutral hydrocarbon oils and sulfur compounds, said fraction having a boiling range of at least 25° between about 180 and 230° C., resin B being a resin selected from the class consisting of thermoplastic and thermosetting resinous compositions.

3. A thermoplastic phenolic-type novolac resin according to claim 2 which is a condensation product of from 25 to 75 percent by weight of resin A and from 75 to 25 percent by weight of resin B.

4. A thermoplastic phenolic-type novolac resin according to claim 3 wherein the cresylic acid distillate fraction includes at least cresols, xylenols, and monoethylphenols.

5. A thermosetting phenolic-type resin comprising in intimate admixture from 5 to 20 percent by weight of a curing agent for phenolic resins and from 95 to 80 percent by weight of a thermoplastic phenolic-type novolac resin comprising a condensation product of resins A and B wherein resin A is a thermoplastic phenolformaldehyde novolac resin and resin B is an alkaline-catalyzed incompletely intercondensed resinous composition of formaldehyde and a cresylic acid distillate fraction substantially free of neutral hydrocarbon oils and sulfur compounds, said fraction having a boiling range of at least 25° between about 180 and 230° C., resin B being a resin selected from the class consisting of thermoplastic and thermosetting resinous compositions.

6. A thermosetting resin according to claim 5 wherein said thermoplastic phenolic-type novolac resin component is a condensation product of from 25 to 75 percent by weight of resin A and from 75 to 25 percent by weight of resin B.

7. A thermosetting resin according to claim 6 wherein the curing agent is hexamethylenetetramine and wherein the cresylic acid distillate fraction includes at least cresols, xylenols, and monoethylphenols.

8. A thermosetting composition suitable for the preparation of shell molds for casting molten metals, comprising from 10 to 500 parts of a particulate inorganic material suitable for foundry use having a fusing temperature above 750° C. and one part of a thermosetting phenolic resin containing in intimate admixture from 5 to 20 percent by weight of a curing agent for phenolic resins and from 95 to 80 percent by weight of a thermoplastic phenolic-type novolac resin comprising a condensation product of resins A and B wherein resin A is a thermoplastic phenol-formaldehyde novolac resin and resin B is an alkaline-catalyzed incompletely intercondensed resinous composition of formaldehyde and a cresylic acid distillate fraction substantially free of neutral hydrocarbon oils and sulfur compounds, said fraction having a boiling range of at least 25° between about 180 and 230° C., resin B being a resin selected from the class consisting of thermoplastic and thermosetting resinous compositions.

9. A composition according to claim 8 wherein said thermoplastic phenolic-type novolac resin component is a condensation product of from 25 to 75 percent by weight of resin A and from 75 to 25 percent by weight of resin B.

10. A composition according to claim 9 wherein the particulate inorganic material consists of an unbonded foundry sand having an AFS fineness range from 70 to 155, the curing agent consists of hexamethylenetetramine, and the cresylic acid distillate fraction includes at least cresols, xylenols and monoethylphenols.

11. In a method for preparing a thermoplastic phenolic-type novolac resin which is a condensation product of a thermoplastic phenol-formaldehyde resin and a cresylic acid-formaldehyde resin wherein one molar equivalent of a cresylic acid distillate fraction containing at least two phenolic components having different resinification reactivities with respect to formaldehyde and boiling between about 180 and 230° C. is reacted in the presence of an inorganic nonvolatile metal-derived alkaline condensation catalyst with a quantity of a formaldehyde-yielding condensing material yielding from 0.25 to 0.75 molar equivalents of formaldehyde until substantially all said formaldehyde is consumed by intercondensation with a portion of said cresylic acid distillate fraction to form an incompletely intercondensed cresylic acid-formaldehyde resinous composition, the step of adding to said resinous composition, at any stage prior to distilling off from said composition not more than 90 percent of the unreacted cresylic acids at a temperature below about 140° C., a thermoplastic phenol-formaldehyde novolac resin to chemically react therewith whereby water of condensation is formed, distilling off the formed water and unreacted cresylic acids at a temperature below about 190° C., and recovering the thermoplastic phenolic-type novolac resin condensation product as a distillation residue.

12. In a method for preparing the thermoplastic phenolic-type novolac resin which is a condensation product of a thermoplastic phenol-formaldehyde resin and a cresylic acid-formaldehyde resin wherein one molar equivalent of a cresylic acid distillate fraction substantially free of neutral hydrocarbon oils and sulfur compounds, said fraction having a boiling range of at least 25° between about 180 and 230° C., is reacted in the presence of an inorganic nonvolatile metal-derived alkaline condensation catalyst with a quantity of formaldehyde-yielding condensing material yielding from 0.25 to 0.75 molar equivalents of formaldehyde until substantially all said formaldehyde is consumed by intercondensation with a portion of said cresylic acid distillate fraction to form an incompletely intercondensed cresylic acid-formaldehyde resinous composition, the step of adding to said resinous composition, at any stage prior to distilling off from said composition not more than 90 percent of the unreacted cresylic acids at a temperature below about 140° C., a thermoplastic phenol-formaldehyde novolac resin to chemically react therewith whereby water of condensation is formed, distilling off the formed water and unreacted cresylic acids at a temperature below about 190° C., and recovering the thermoplastic phenolic-type novolac resin condensation product as a distillation residue.

13. The method according to claim 12 wherein the alkaline catalyst is neutralized and the resinous composition is dehydrated prior to addition thereto of the thermoplastic phenol-formaldehyde novolac resin.

14. The method according to claim 12 wherein from one to three parts of the cresylic acid-formaldehyde resin are reacted with one part of the phenol-formaldehyde novolac resin.

15. The method according to claim 14 wherein the cresylic acid distillate fraction includes at least cresols, xylenols and ethylphenols.

16. The method for preparing a shell molding thermoplastic phenolic-type novolac resin having a melting point between about 85 and 115° C., which comprises intercondensing one molar equivalent of a cresylic acid distillate fraction substantially free of neutral hydrocarbon oils and sulfur compounds, said fraction having a boiling range of at least 25° between about 180 and 230° C. and including at least cresols, xylenols and monoethylphenols, with from 0.54 to 0.58 mole of formaldehyde in the presence of from 0.5 to 5 percent alkali-metal hydroxide condensation catalyst by weight of the cresylic acid fraction until substantially all said formaldehyde is consumed by intercondensation with a portion of said cresylic acid distillate fraction to form an incompletely intercondensed cresylic acid-formaldehyde resinous composition, distilling said composition only until all water of condensation is removed therefrom, adding to the reaction system from one-third to one part of an acid-catalyzed thermoplastic phenol-formaldehyde novolac resin for each part of the cresylic acid-formaldehyde resin, heating the mixture to condense the thermoplastic phenol-formaldehyde novolac resin and the incompletely intercondensed cresylic acid-formaldehyde resin whereby water of condensation is formed, distilling off the formed water and the unreacted cresylic acids present, and recovering the thermoplastic phenolic-type novolac resin condensation product as a distillation residue.

References Cited in the file of this patent

UNITED STATES PATENTS 2,541,688    Cardwell _____ Feb. 13, 1951
2,856,381    McNaughtan et al. _____ Oct. 14, 1958

UNITED STATES PATENT OFFICE
CERTIFICATE OF CORRECTION

Patent No. 3,027,345                        March 27, 1962

Elsio Del Bel et al.

It is hereby certified that error appears in the above numbered patent requiring correction and that the said Letters Patent should read as corrected below.

Column 5, Table I, column 1, line 9 thereof, for "2,3-Zylenol" read -- 2,3-Xylenol --; column 6, line 56, for "constitute" read -- constituent --; column 8, line 16, for "emplyoed" read -- employed --; column 14, line 65, for "3" read -- 33 --; column 15, line 50, for "application" read -- applications --; column 16, line 23, for "thermoplyastic" read -- thermoplastic --.

Signed and sealed this 17th day of July 1962.

(SEAL)
Attest:

ERNEST W. SWIDER
Attesting Officer

DAVID L. LADD
Commissioner of Patents